United States Patent

Cummings et al.

[15] 3,676,321

[45] July 11, 1972

[54] ELECTROCHEMICAL OXYGEN DEMAND SYSTEM

[72] Inventors: John P. Cummings, Minneapolis; Richard E. Berg, Chanhassen, both of Minn.

[73] Assignee: Honeywell Inc., Minneapolis, Minn.

[22] Filed: July 27, 1970

[21] Appl. No.: 58,254

[52] U.S. Cl. ........................204/195 R, 204/1 T, 204/195 B
[51] Int. Cl. ...........................................................G01n 27/46
[58] Field of Search ..............................204/1 T, 195 R, 195 B

[56] References Cited

UNITED STATES PATENTS 2,246,981   6/1941   Matheson et al. ......................204/195

OTHER PUBLICATIONS

Kolthoff et al., " Polarography," 2nd ed., 1952, pp. 364– 367, 399, 400 & 556

*Primary Examiner*—T. Tung
*Attorney*—Arthur H. Swanson, Lockwood D. Burton and Mitchell J. Halista

[57] ABSTRACT

A method and system for the determination of organic and inorganic waste products present in aqueous samples, the arrangement including cell means for receiving a flow of an aqueous sample therethrough with means for delivering a predetermined quantity of a water soluble electrolyte into said sample prior to passing through said cell. Heating means are provided for maintaining the sample at a predetermined temperature level as it passes through said cell. The cell includes a plurality of space electrodes including a reference electrode, an indicating electrode, and a common electrode in circuit with said reference and indicating electrodes. A first circuit is coupled to the reference and common electrodes and a unipolar electrical signal is impressed thereacross, the magnitude being sufficient for aqueous electrolysis, A second circuit means is coupled to said indicating and common electrodes and delivers a scanning signal of a programmed potential magnitude with periodic increases and decreases in respect to time, the peak magnitude of said scanning signal being less than that required for aqueous electrolysis. Readout means are arranged in series with said indicating and common electrodes for determining the current flow through said second circuit means in response to the scanning signal. The system is also useful for the determination of carbon monoxide in gaseous atmospheres.

15 Claims, 7 Drawing Figures

ELECTROCHEMICAL OXYGEN DEMAND SYSTEM

CROSS-REFERENCE TO RELATED APPLICATION

The present invention is concerned with an electrolytic technique for determination of organic waste products in aqueous samples, and involves a substantially continuous voltage scan non-exhaustive technique for this determination. A modified system and technique for determination of organic waste products in aqueous samples is disclosed and claimed in the co-pending application of John P. Cummings, a co-inventor herein, entitled "Exhaustive Electrolysis System For Determination Of Oxygen Demand," Ser. No. 58,448 executed on even date herewith, and assigned to the same assignee as the present invention.

BACKGROUND OF THE INVENTION

1. Field of the Invention

The present invention relates to an electrochemical oxygen demand sensor which is utilized to quantitatively determine the organic waste content present in aqueous samples, including raw, treated, or partially treated sewage samples, as well as industrial waste products or the like. The invention involves an electrolytic determination wherein a predetermined quantity or concentration of an electrolyte is provided for a sample and a scanning voltage is applied across a pair of electrodes disposed in the sample, and diffusion and subsequent reaction of the species undergoing determination provides an output reading from an indicating electrode which is indicative of certain solution parameters including the quantity of dissolved oxygen present, as well as unstabilized organics and chloride ion concentrations. Since the parameter being measured is essentially the electro-activity, the system may be utilized for carbon monoxide detection.

In addition to the determination of water quality, or the determination of sewage treatment effectiveness, it is frequently desirable to locate sources of pollution influx into a body of water, such as a natural or artificial lake. These sources of pollution may occur from incoming streams, private sewage disposal fields for residences or dwellings, or the disposal of sewage plane effluents. The dissolved oxygen and chloride ion concentrations may be determined over the area of an entire lake body, and the dissolved organics can be monitored in areas where they are concentrated, such as adjacent incoming streams or along the lake bottom. For example, a determination may be made that organics are concentrating at the bottom of a lake body with the resulting decrease in dissolved oxygen endangering the condition of the lake. Since water turn-over in a normal natural body of water such as a lake requires a period of 10 to 20 years, it is frequently desirable to monitor the water quality prior to the achieving on an intolerable level of pollution in the lake.

The dissolved oxygen level in a body or stream of water is affected by the action of bacteria upon unstabilized organic waste material present therein. Coliform bacteria are present in any human waste stream along with nutrients (nitrate and phosphate) for algal growth. The chloride ion concentration is also becoming an important factor because of the tendency for bodies of water to increase in salinity, and accordingly become either brackish or possibly corrosive.

2. Description of the Prior Art

The oxygen demand of aqueous samples is generally regarded as the single most important quality parameter utilized to monitor the quality of a water supply or the effectiveness of treatment of sanitary and certain industrial plant effluents. The oxygen demand or the amount of dissolved oxygen required for the stabilization of dissolved organic material present in a sample has traditionally been measured by means of the 5-day biochemical oxygen demand (BOD) test. Generally speaking, the BOD test determines the oxygen consumed by bacteria during their normal metabolic processes on dissolved and biologically unstabilized organic matter. Under normal conditions of temperature and pressure, about 20 days are required for complete stabilization, but practical and reasonably reproducible results may be obtained after a period of five days.

For many control purposes, the five-day period is unreasonably long and unworkable. Therefore, several non-biological tests have been introduced and utilized for measurement of dissolved organic matter. One such test is known as the chemical oxygen demand (COD) test which involves a two-hour dichromate reflux period for the sample with concentrated sulfuric acid-dichromate solutions. This test is routinely utilized by the Public Health Service in water quality monitoring. In addition to the COD test, several automated oxygen demand and analyzers have been introduced and are currently being utilized. These automatic oxygen demand analyzers normally utilize the principle of complete combustion of the dissolved organic materials to the final oxidation products of carbon dioxide and water, and an analysis of the product gases provides a measure of the oxygen demand.

The method and apparatus of the present invention provides for the rapid determination of water quality by means of a voltage scanning technique wherein a linearly increased DC voltage is applied across a pair of spaced electrodes and the current, as a function of this voltage, is continuously monitored. In accordance with this technique, the dissolved oxygen level, the relative amount of unstabilized organics present in the sample, as well as the relative concentration of dissolved chloride ion among other constituents may be determined.

SUMMARY OF THE INVENTION

Briefly, in accordance with the present invention, a sample transmission or flow chamber is provided and a group of three electrodes are arranged within the chamber in spaced relationship, preferably spaced along the direction of sample flow through the chamber, and in contact with the sample. The three electrodes are an indicating electrode, a reference electrode, and a third, or common, electrode, which is in circuit with the reference and the indicating electrodes.

In operation, the sample is acidified, and is thereafter passed through the flow chamber. A low current, preferably of the order of a few milliamps, is passed between the common and reference electrodes, this current being obtained from a constant current DC source. Under conditions of current flow, hydrogen gas is evolved from one of the electrodes, with oxygen gas being evolved from the other. The observed reference voltage or reference point is obtained from the electrode evolving hydrogen, this electrode being polarized and maintaining a constant voltage since the hydrogen ion concentration is fixed by the sample flow through the cell. The pressure of the hydrogen gas evolved at the electrode is also constant, this pressure being one atmosphere.

The indicator electrode and the common electrode form the two electrode polarographic portion of the system. The current read-out is obtained by measuring a voltage drop across a standard resistor.

In accordance with this system, the oxygen content of the sample may be determined by noting the value of the voltage when the current increases rapidly in the negative direction. The output curve moves toward more positive values as the oxygen level of the sample increases. The second characteristic portion of the curve is responsive to the oxidation of unstabilized organic material present in the sample, this portion of the curve occurring at an applied voltage of about 1.4 to 1.5 volt, where a current peak occurs. A lowering in the amount of unstabilized organic material in the sample is indicated by the decrease in current as a function of processing time. The third characteristic portion of the curve occurs in response to chloride ion concentration, this portion occurring at a point where the current begins to increase rapidly in the positive direction. This current rise moves toward less positive voltage as the chloride ion concentration increases.

Therefore, it is a primary object of the present invention to provide an improved system for the determination of water quality in aqueous samples by electrolytic techniques, the system being adaptable for rapid and continuous determinations of those certain parameters which determine the quality of the sample.

It is a further object of the present invention to provide a rapid and continuous technique for the determination of certain parameters of water quality, including a determination of dissolved oxygen content, the presence of unstabilized organic material in the sample, along with chloride ion concentration.

It is yet a further object of the present invention to provide a rapid and continuous technique for the determination of certain parameters of water quality including dissolved oxygen content, presence of unstabilized organic material, and chloride ion concentration, the technique employing a simple electrochemical cell utilizing electrical measuring techniques which may be expeditiously accomplished without the need for expensive or unusual components.

Other and further objects of the present invention will become apparent to those skilled in the art upon a study of the following specification, appended claims and accompanying drawings.

DESCRIPTION OF THE PREFERRED EMBODIMENT

Figure 1:
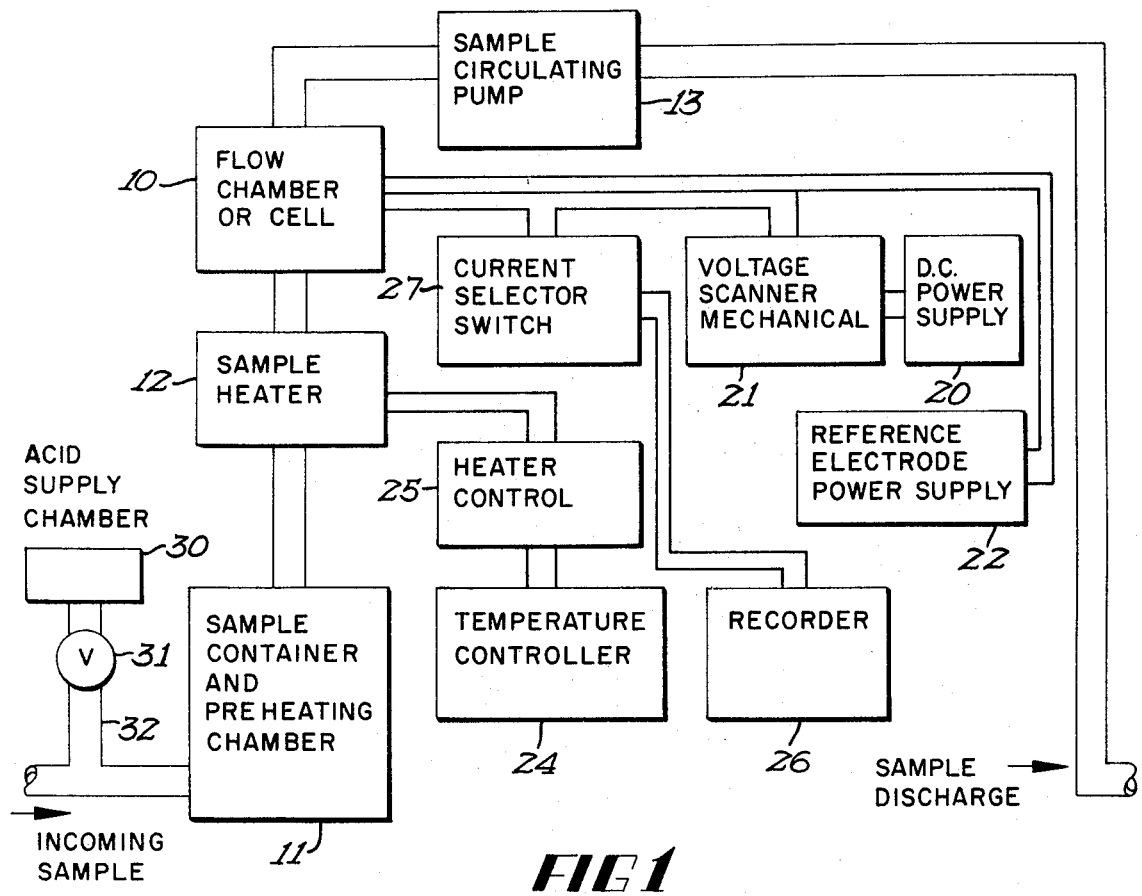
FIG. 1 is a block diagram of the electrochemical system utilized for measuring water quality, or pollution monitoring.

In accordance with the preferred embodiment of the present invention, and with particular reference being directed to FIG. 1 of the drawings, the block diagram shows the arrangement of the components forming the electrochemical instrument of the present invention which is adaptable for use in determination of water quality or pollution monitoring. The system includes a flow chamber or cell 10 which is adapted to receive incoming sample material by means of a suitable conduit arrangement or scheme, as shown, the incoming sample initially being passed through the sample container and pre-heating chamber 11 where the temperature of the sample is raised to a level substantially equal to the testing temperature desired. Upon leaving the pre-heating chamber 11, the material flows through the heater chamber 12 where it is heated to the final testing temperature, and is thereafter passed through the flow chamber or cell 10. Upon leaving the cell 10, the sample is discharged from the conduit system, as indicated. A suitable pumping means is provided for circulating the sample through the system, such as the pump shown at 13, this pump being either of the positive displacement type or vane type, it being understood that any suitable pumping source may be employed successfully. In order to avoid pulsations in current flow, it is generally desirable to employ a pump system which has a substantially steady-state output, which is free of pulsations or fluctuations in pressure or flow, this condition being readily obtainable by proper pump selection, or by the use of pressure accumulators or the like. Such systems are, of course, commercially available.

The sample container and pre-heating chamber 11 is preferably provided with a resistance heater or the like which is capable of elevating the temperature of the incoming sample to a level which is just slightly below the testing temperature. Upon leaving chamber 11, the sample flows toward the flow chamber or cell 10, and passes adjacent a second heater arrangement such as the sample heater 12, which raises the temperature of the sample to the desired level. Because of the control desired, a temperature controller and heater control are provided for controlling the operational characteristics of the sample heater arrangement 12. While passing through the flow chamber or cell 10, the sample is subjected to the influence of a reference voltage, the response of the cell to this reference voltage being indicative of certain quality determining parameters of the sample.

Figure 2:
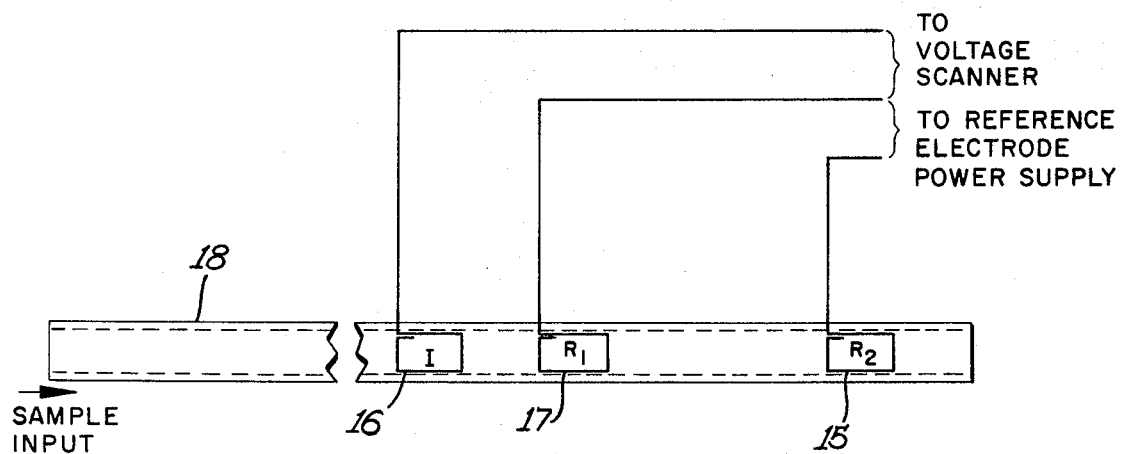
FIG. 2 is a schematic diagram of the electrochemical cell utilized in the system of FIG. 1.

In order to better comprehend the function of the cell, attention is now directed to FIG. 2, with continued attention being directed to FIG. 1. In FIG. 2, which is a schematic of the flow chamber or cell 10, a group of electrodes are illustrated including a reference electrode 15 coupled to a reference electrode power supply, and an indicating electrode 16, which is coupled to a voltage scanner. A third, or common, electrode 17 is arranged in common and in circuit with both the reference electrode power supply, as indicated, and the voltage scanner, as indicated. These electrodes are preferably fabricated from platinum sheet, and are oriented parallel to the stream flow so as to prevent or reduce gas bubble and particle build-up on the electrode surfaces. By way of example, for a flow chamber or cell having a general cylindrical configuration, with an I.D. of 5.5 millimeters, the reference electrodes, electrodes 15 and 17, were 1.0 cm × 0.5 cm, while the indicating electrode 16 was 0.5 cm × 0.5 cm. All electrodes were 5 mils in thickness.

While electrode spacing is generally not critical, a spacing of approximately one inch is desired between the leading edges of the indicating electrode 16 and the common electrode 17, while a spacing of 2 inches is desired between the leading edges of the reference and common electrodes 15 and 17 respectively. In order to minimize turbulence, it is normally preferred that there be a reasonable lead-in section provided in the cell, such as is illustrated at 18, this section being utilized to reduce turbulence, cavitation, or the like in the fluid passing through the cell and undergoing determinations therein.

VOLTAGE SCANNER POWER SUPPLY

A source of linearly changing DC voltage is required for this portion of the system. For most purposes of water quality determination, the output should be capable of delivering power from 0 to about 3 volts, this potential being applied across the indicator electrode 16 and the common electrode 17 on the cell 10. By using solid-state circuit and a Zener diode stabilized output, there is no need for voltage standardization and the output characteristics are normally adequate for pollution studies. Power supplies of such characteristics are readily available commercially and are standard in the art. In the system, such a DC power supply is shown at 20.

A stabilized signal from the DC power supply 20 is applied across a helipot which is employed to perform the function of limiting the voltage scan. By adjusting of this resistor, the voltage range scanned is preferably variable from 0 volt to a maximum of about 3.5 volts. The scan rate is selected by appropriate adjustment of the motor driving the helipot, this arrangement being incorporated in the block diagram of FIG. 1 at 21. Motor driven helipots are also readily available commercially, and may of course, be appropriately selected for use in connection with this apparatus.

REFERENCE ELECTRODE POWER SUPPLY

The reference electrode power supply is very simple, and normally consists of two variable resistors which are of high enough resistance to limit the current flow regardless of small impedance changes within the cell. Preferably, a 6 volt-lantern battery may be utilized to supply power for this constant current supply with read-out being obtained on a simple meter. This power supply is shown in the block diagram of FIG. 1 at 22. Also, see FIG. 5.

AUXILIARY EQUIPMENT

As has been previously indicated, two heaters are normally employed for temperature control. A first heater is provided for the sample container and pre-heating chamber 11, which, as indicated, may be a simple immersion type resistance heater or the like. This heater must be capable of raising the temperature of the sample, for a flow rate of a minimum 100 cc/min. to a temperature of about 35° C. Final temperature regulation is obtained by means of the heater retained within the sample heater chamber 12, this heater preferably being a resistance heater which is in contact with the sample per se, or the conduit carrying the sample. The electrical input of this resistance heater is controlled by temperature controller 24 operating through heater control 25. Temperature controller 24 may be, for convenience, a thermistor sensor which operates to control the current flow through heater control 25. Temperature controllers and heater controls of this type are, of course, commercially available.

In order to achieve read-out of the conditions within the flow chamber or cell 10, a strip chart recorder or electronic ammeter may be utilized for the current read-out, this structure being shown in the block diagram of FIG. 1 at 26. For proper operation of the recorder, current selector switch 27 is provided to assist in the operation of the read-out recorder 26.

TYPICAL OPERATION OF THE SYSTEM

With continued attention being directed to FIG. 1, it will be seen that the incoming sample is carried through suitable conduit means to the sample container and pre-heating chamber 11. Prior to its introduction into the chamber 11, a predetermined quantity of a mineral acid such as sulfuric acid is added to the sample until a final concentration of 0.35 N $H_2SO_4$ is obtained. A control valve at 31 monitors the flow of acid into the sample, with conduit means 32 communicating with the conduit carrying the incoming sample, as indicated. The acidified samples are pre-heated to about 35° C. in chamber 11, and are thereafter passed through sample heater chamber 12, where the temperature is increased to about 40° C. The tolerance level for the sampling material leaving sample heater 12 is preferably of the order of about ±2.0° C.

With the pump 13 calibrated at a flow of 100 cc/min., the reference electrode power supply 22 was turned on and a current flow of 5 ma was established. As is indicated in FIG. 1, only one pass of the sample material was utilized.

Upon achieving the stability in temperature an flow rates, the scanning voltage is applied to the cell across electrodes 16 and 17. The scanning voltage is selected to range from 0 up to 2.5 volts. The current was monitored by voltage measurement (displayed on recorder 26) across a standard resistor, placed into the circuit by means of the current selectivity switch 27. The time axis of the recorder was also utilized as a voltage axis for the applied voltage, since a linear scan was utilized and the voltage axis of the recorder served as the current display.

RESULTS OBTAINED ON SEWAGE SAMPLES

Figure 3:
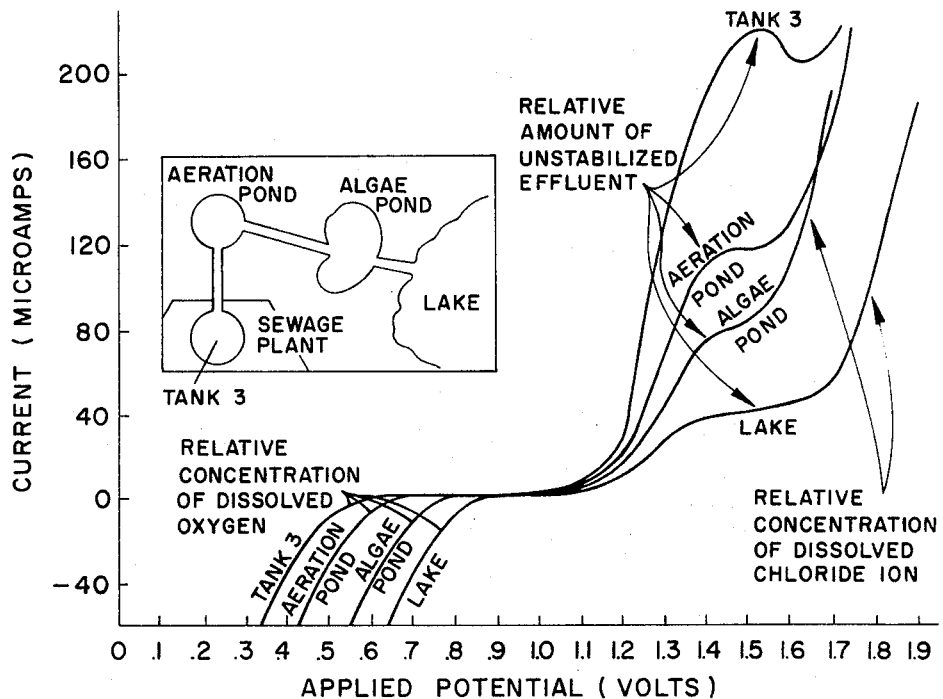
FIG. 3 is a typical curve obtained with the apparatus shown in FIGS. 1 and 2, the curves showing the relationship between the pollution level and extent of water processing of a typical sewage plant effluent.

The results of the pollution studies obtained from sewage samples are illustrated in terms of the data obtained in the curves of FIG. 3. As is indicated, the relative concentrations of dissolved oxygen, the relative amount of unstabilized organic material present in the sample, as well as the relative concentration of dissolved chloride ion are graphically illustrated. The relative amounts of dissolved oxygen present in the sample, along with the relative amounts of the pollutants including unstabilized organic material and dissolved chloride ion can be determined at three points along the current-voltage curves.

The oxygen content can be determined by noting the value of the voltage when the current increases rapidly in the negative direction. The curve moves toward more positive voltages as the oxygen level increases. Noting FIG. 3, this means the oxygen level increases as the sample approaches the lake.

The second characteristic part of the curve is at an applied voltage of about 1.4 to 1.5 volts where a current peak occurs. This peak is due to the oxidation of unstabilized organic material in the sample. This material is continually acted upon by bacteria along the path to the lake until the degradation is nearly complete. The lowering in the amount of unstabilized material is indicated by the increase in current as a function of processing time (FIG. 3).

The third characteristic part of the curve is the voltage at which the current begins to increase rapidly in the positive direction. This current rise moves toward less positive voltages as the chloride ion increases. In FIG. 3 it is apparent that the chloride ion content is unchanged as the effluent proceeds through the plant, but the chloride ion concentration is much lower in the lake proper.

Figure 4:
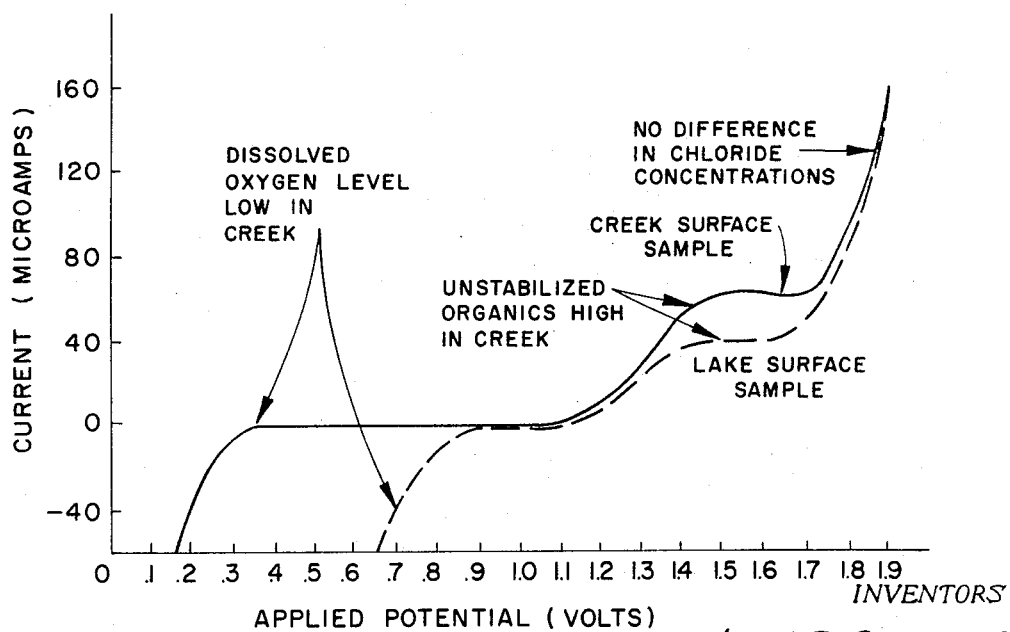
FIG. 4 is a curve illustrating the relationship between pollution characteristics of a typical lake sample and a surface sample collected from a creek flowing into the lake.

Attention is now directed to FIG. 4 of the drawings wherein the curve illustrates the relationship between pollution characteristics of a typical lake surface sample and a surface sample collected from a creek which flows into the lake. The dissolved oxygen level is relatively high in the lake, and is relatively low in the creek. The concentration of unstabilized organics appears high in the creek, and relatively lower in the lake surface sample. There is no significant difference indicated in chloride ion concentrations.

It will be appreciated that the system of the present invention may be employed on shipboard. As such, it may be utilized as a general pollution detector for determining the source of introduction of pollutants into a body of water, if desired, or for other purposes. Since the instrument provides a test time for only several minutes or less, a shipboard installation could be utilized to map a body of water for the presence of several pollutants, which may occur in the water body. The presence of unstabilized organic material and chloride ion indicate waste discharge into a body of water, with organic waste originating from human excreta and household wastes, while chloride ion normally originates from water regeneration systems, household wastes and water run-off. Industrial pollutants may also be determined in this fashion.

Figure 5:
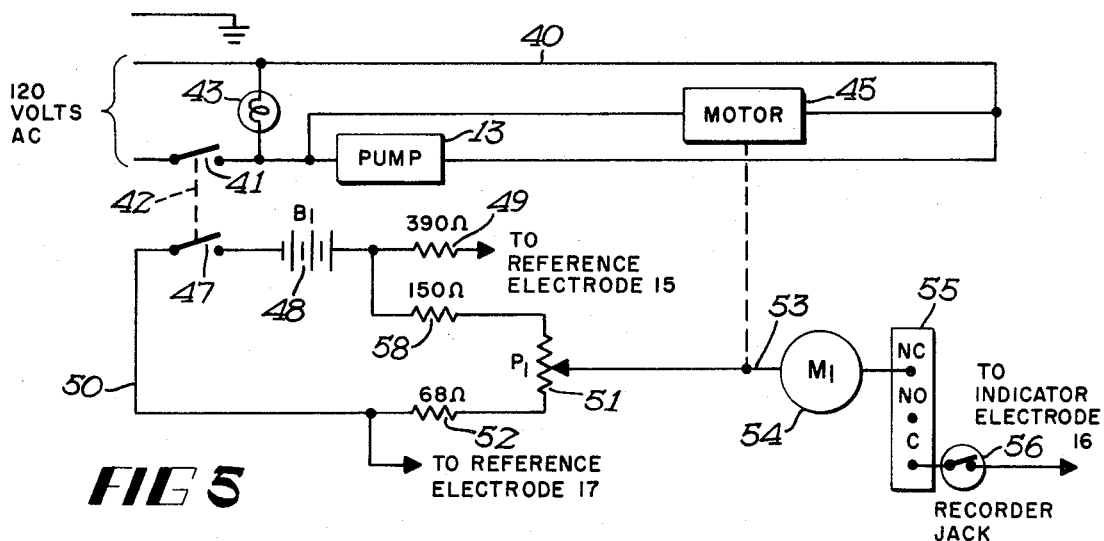
FIG. 5 is a schematic diagram of a circuit which may be employed in the system of the present invention.

Attention is now directed to FIG. 5 of the drawings which illustrates a typical circuit useful in connection with the present invention. The system includes a conventional 120-volt power source, as indicated, which is connected across the mains 40 and 41. A ganged switch 42 is utilized to turn the system on, and indicator light 43 is utilized to represent the immediate situation. The 120-volt supply source supplies power to drive the pump member 13, which corresponds to the structure shown in FIG. 1, as well as the potentiometer driver motor 45.

With attention now being directed to the lower portion of the schematic of FIG. 5, this arrangement is energized upon closing of the contacts 47 of switch 42, thus closing the circuit to the electrochemical components of the system. Reference electrode 15 is coupled to the positive pole of battery 48 through series resistor 49, while common electrode 17 is coupled to the negative pole of battery 48 along bus 50. Bus 50 is coupled to one terminal of the potentiometer winding 51 by way of resistor 52, with the wiper 53 of the potentiometer being coupled to indicator electrode 16 through meter 54 and switch element 55. A recorder jack is provided at 56 for the purpose of receiving the output from indicator electrode 16. The other terminal of potentiometer winding 51 is coupled to the positive pole of battery 48 through resistor 58, thus completing the circuit.

The following table is provided to indicate typical circuit values:

Table I

| | |
|---|---|
| Battery 48 | Three 1.35 volt mercury cells |
| Resistor 49 | 390 ohms |

| | |
|---|---|
| Resistor 52 | 68 ohms |
| Potentiometer 51 | 100 ohms, 360° mechanical rotation |
| Resistor 58 | 150 ohms |
| Meter 54 | 100 microamp meter |
| Motor 45 | 10 RPM synchronous motor |

ELECTROCHEMICAL CARBON MONOXIDE DETECTOR

Figure 6:
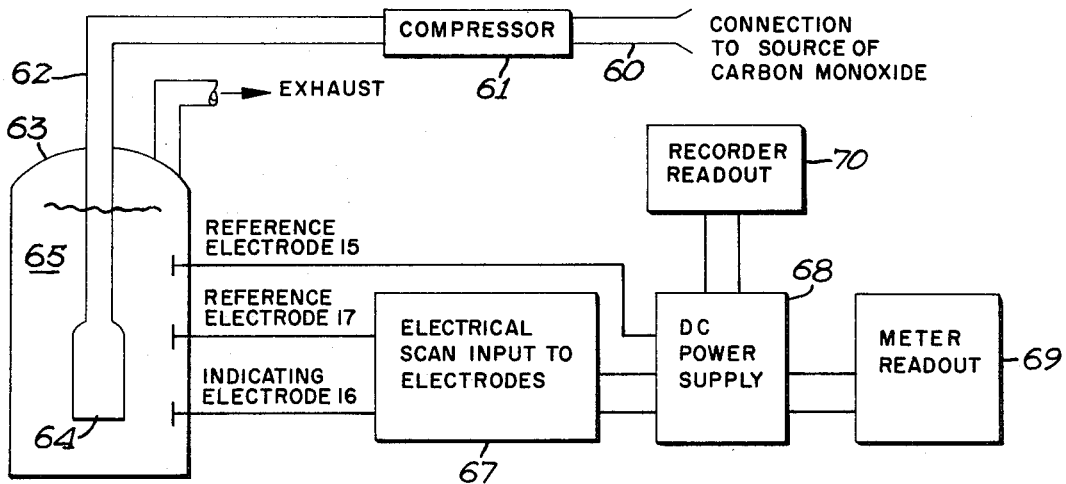
FIG. 6 is a diagram of a system of the present invention which may be utilized for the detection of carbon monoxide.

Attention is now directed to FIG. 6 of the drawings wherein a system for the detection and determination of carbon monoxide utilizing the principles of the present invention, is schematically illustrated. In this system, a sample of a gas from a source which may contain carbon monoxide is coupled to conduit 60 communicating with compressor 61. The output of compressor 61 delivers the sample through conduit 62 into test vessel 63, discharging the gas into the solution contained therein through the port 64. The solution contained within vessel 63, shown at 65, is preferably 0.5 N $H_2SO_4$. Vessel 63 is provided with three spaced electrodes, these electrodes corresponding to reference electrodes 15 and 17, and indicating electrode 16. An electrical input is provided to these electrodes from the scan input arrangement shown at 67, this scan input being, of course, based upon the circuit shown in FIG. 5. As is illustrated in FIG. 6, a power supply is provided as at 68, with a meter read-out device shown at 69, along with a recorder read-out device as shown at 70. These components are also conventional in the art and there is accordingly no unusual requirement for these features of the system.

In operation the conduit means 60 is initially coupled to the source of carbon monoxide, such as, for example, the exhaust pipe of an internal combustion engine, and this input is then pumped by means of compressor element 61 into the sulfuric acid solution 65 retained in vessel 63. In this arrangement, therefore, the reference electrode 15 functions as a voltage reference, and electrodes 16 and 17 function to indicate the presence of electro-active material in the solution. For carbon monoxide oxidation reactions, the voltage scan extends from 0.7 volt to 1.5 volt over a period of between 20 and 60 seconds. Under these conditions, electrolysis of the solution occurs and the electrolysis current is limited by the diffusion or adsorption of the electro-active material. This electrolysis current, therefore, may be used to monitor the concentration of the electro-active carbon monoxide present in the solution. The current-voltage curves are reproducible since the electrode surface is continually renewed with each scan. The observed difference in current levels achieved with and without the electro-active material present is proportional to the bulk concentration of the electro-active material in the solution. In this case, carbon monoxide is the electro-active material. It will be appreciated that the operational characteristics of the carbon monoxide detector are not significantly different from those utilized in the detection of other electro-active materials in solutions, such as oxygen, organic products, and the like.

Figure 7:
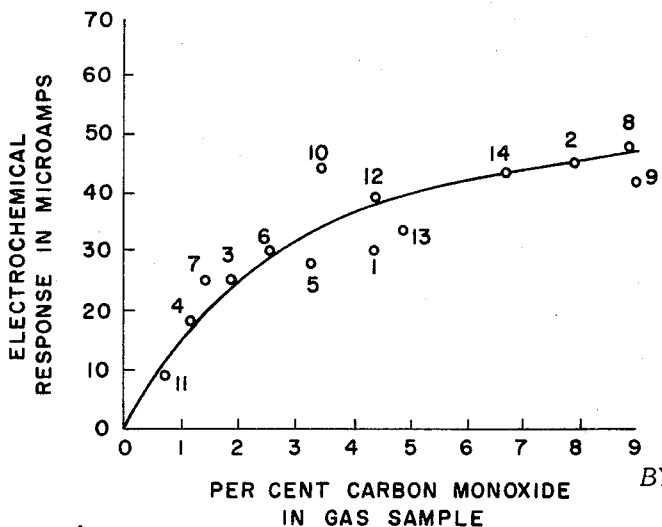
FIG. 7 is a curve illustrating typical peak current values obtained as a function of carbon monoxide content of the gas sample uses the current in the operation of the apparatus of FIG. 6 and using a scan of 20 seconds.

With attention being directed to FIG. 7, it will be appreciated that the output curve achieved represents the percentage of carbon monoxide present in the gaseous mixture forming the source of carbon monoxide.

The response time of this apparatus when employed as a carbon monoxide detector, is a function of two related properties, the first being the electrode response to the carbon monoxide dissolved in the electrolyte, the second being the equilibration time required for the dissolution of gaseous carbon monoxide. Since electrode response time is negligible, the total limiting feature is the equilibration time. In an electrolyte volume of about 50 cc., carbon monoxide concentration ranging from 0 percent up to about 3 percent may be detected in substantially 1 minute, and if the volume of electrolyte is diminished, time can be reduced accordingly.

The apparatus responds to carbon monoxide along a reasonably linear curve from 0 up to about 1.5 percent of carbon monoxide, this curve then tailing to where only modest sensitivity was observed above about 7 percent. The curve is reasonably linear and highly reproducible in the ranges of from between about 0.25 percent and 5 percent.

THEORETICAL CONSIDERATIONS

It will be appreciated that the electrode area is selected so as to be sufficiently small to limit current flow through the cell. Since very little electro-active material is consumed in the electrochemical reaction, a much shorter test time is required. The potential which is applied to the cell is sufficiently low so as to be below the potential required for the evolution of oxygen. Thus, only reactions involving the oxidation of organic and selected inorganic substances occur. The voltage-current relationship determined prior to the evolution of oxygen is normally primarily a function of the concentration of the electro-active material present in the sample.

The magnitude of the observed current for a given concentration of electro-active material depends upon two factors. The first is the diffusion rate of reactant to the electrode, and if this rate is small, only a few electrons can be transferred in a given time period. This rate is dependent primarily upon temperature, rate of sample motion, molecular size, electrode size, solvent effects, and most importantly, the bulk concentration of reactant.

The second factor involves the reaction rate at the electrode surfaces. Once the reactant arrives at the electrode surface, a number of steps occur. Generally, some form of the reactant is absorbed into the surface, electron transfer occurs, product desorption processes follow, and with product removal, a continual supply of reactant reaches the electrode. Each stage can be described by an appropriate rate expression which, taken in total, indicates the electrochemical reaction rate.

In a given sample, before the electro-oxidation of electro-active materials begins, the current is practically identical to the charging current, that is, the i-E relationships are due primarily to the pure supporting electrolyte. This portion of the curve is followed by a range of potential were a steep increase in current is observed. This steep increase is followed by a narrow range of potential where the current remains practically constant and parallel to the charging current. This leveling off is characteristic of reversable inorganic systems, and is called the limiting current or wave height for the system. For organic systems, however, the electrode reactions which occur result in a lessening in diffusion control which is manifested by a diminishing current. It is likely that the adsorption rate of electrode blocking by-product slows the reaction, however, the current is observed to drop because of the depletion of material available at the electrode. This observed as a peak on the i-E curve.

Generally, voltametric procedures are applied to single species existing in solution. In such cases, diffusion currents can be assigned. The diffusion current is proportional to the bulk concentration according to the well-known Ilkovic Equation. The peak current that is observed in sewage runs is found to be a proportional to the bulk concentration of unstabilized organic materials present.

For most determination operations, a scan rate in the area of about 0.3 to 3 volts/min. was employed. Normally, a scan rate of about 0.3 volt/min. is preferred.

The preferred electrolyte for use in the samples undergoing determination is sulfuric acid, and concentrations ranging from about 0.25 N up to about 1.0 N may be successfully utilized. While other mineral acids may be employed, it is appreciated that sulfuric acid is preferred as a supporting electrolyte inasmuch as sulfates are normally electrically inactive.

The results obtained with the apparatus of the present invention compare favorably with BOD determinations.

We claim:

1. In a system for the determination of the electro-activity of ingredients present in aqueous samples:
   a. cell means for receiving an aqueous sample containing a supporting electrolyte and electro-active components undergoing determination;
   b. a plurality of spaced electrodes including a reference electrode, an indicating electrode, and a common electrode, each electrode being disposed within said cell and in contact with said sample;

c. first circuit means coupled to said reference electrode and common electrode for impressing a unipolar electrical signal thereacross of a magnitude sufficient for aqueous electrolysis, and adapted to deliver a current of constant magnitude;

d. second circuit means coupling said common electrode to said indicating electrode;

e. signal generating means in said second circuit means for applying a unipolar scanning signal across said indicating electrode and said common electrode, said scanning signal having a programmed potential magnitude with predetermined increases and decreases with time; and f. electrical current read-out means in said second circuit means and in series with said common electrode and said indicating electrode for determining the current flow through said second circuit means in response to said scanning signal.

2. The system as defined in claim 1 being particularly characterized in that means are provided for maintaining said aqueous sample at a substantially constant temperature.

3. The system as defined in claim 1 being particularly characterized in that heating means are provided for maintaining said sample at a certain predetermined temperature.

4. The system as defined in claim 1 being particularly characterized in that means are provided for passing a fluid sample undergoing determination through said cell.

5. The system as defined in claim 1 being particularly characterized in that means are provided for moving a gaseous fluid sample containing an electro-active component through said cell.

6. The system as defined in claim 1 being particularly characterized in that said indicating electrode and common electrode are spaced apart by a predetermined distance and wherein said reference electrode and said common electrode are spaced apart by a distance which is greater than said predetermined distance.

7. In a system for the substantially continuous determination of electro-activity of ingredients present in aqueous samples:

a. cell means for receiving a flow of an aqueous sample with means for delivering and discharging the flow of said sample to and from said cell;

b. means delivering a predetermined quantity of a water soluble electrolyte into said sample for maintaining said electrolyte in said sample at a predetermined concentration level;

c. a plurality of spaced electrodes including a reference electrode, an indicating electrode, and a common electrode, each electrode being disposed within said cell and in contact with said sample;

d. heating means for maintaining said sample at a certain predetermined temperature level within said cell;

e. first circuit means coupled to said reference electrode and common electrode for impressing a unipolar electrical signal thereacross of a magnitude sufficient for aqueous electrolysis, and adapted to deliver a current of constant magnitude;

f. second circuit means coupling said common electrode to said indicating electrode;

g. signal generating means in said second circuit means for applying a unipolar scanning signal across said indicating electrode and said common electrode, said scanning signal having a programmed potential magnitude with predetermined increases and decreases with time; and h. electrical current read-out means in said second circuit means and in series with said common electrode and said indicating electrode for determining the current flow through said second circuit means in response to said scanning signal.

8. The system as defined in claim 7 being particularly characterized in that said spaced electrodes are arranged along a predetermined line.

9. The system as defined in claim 8 being particularly characterized in that said indicating and common electrode are spaced apart by a predetermined distance and wherein said reference electrode and said common electrode are spaced apart by a distance which is greater than said predetermined distance.

10. The system as defined in claim 7 being particularly characterized in that said signal generating means in said second circuit means is coupled to a source of electrical energy and is adapted to apply a unipolar scanning signal of a magnitude less than that required for aqueous electrolysis.

11. The system as defined in claim 7 being particularly characterized in that each of said electrodes consists of a precious metal.

12. The system as defined in claim 11 wherein each of said electrodes consists essentially of platinum.

13. The system as defined in claim 9 being particularly characterized in that said distance between said reference electrode and said common electrode is twice said predetermined distance.

14. The system as defined in claim 7 being particularly characterized in that said scanning signal has a peak amplitude less than about 2.5 volts.

15. The system as defined in claim 7 being a particularly characterized in that said indicating electrode and common electrode are spaced apart by a certain predetermined distance, and wherein said reference electrode and said common electrode are spaced apart by a distance which is greater than said predetermined distance.

* * * * *